Aug. 15, 1967  D. SPOONER  3,335,615

DRIVE BELT

Filed May 18, 1965

INVENTOR
DANIEL SPOONER
BY Blum Moscovitz
Friedman Blum
and Kaplan

ATTORNEYS.

United States Patent Office 3,335,615
Patented Aug. 15, 1967

3,335,615
DRIVE BELT
Daniel Spooner, P.O. Box 568,
Long Beach, N.Y. 11561
Filed May 18, 1965, Ser. No. 456,770
10 Claims. (Cl. 74—229)

ABSTRACT OF THE DISCLOSURE

A belt and pulley transmission wherein the belt is long enough to extend around both pulleys without requiring either one of the pulleys to be displaced toward the other when the belt is placed over the pulleys. In the case of a V-belt and V-pulleys, the belt can be finger-pressed into the pulley grooves after it is placed around the pulleys. In order to compensate for the greater length and resulting slack in the belt when it engages the pulleys, the drive belt carries a means for amplifying the effect of centrifugal force which acts on the belt during rotation of the driving pulley, and this latter means may take the form of suitable weights which are embedded within the body of the belt and distributed therealong.

---

The present invention relates to the transmission of power.

More particularly, the present invention relates to belt-and-pulley transmissions.

Belt-and-pulley transmissions are one of the oldest and most widely used types of power transmission. However, these transmissions, particularly where they are of the type where the pulleys are peripherally grooved, still have certain undesirable features which thus far have not been eliminated. For example, when it becomes necessary to change the belt of such a transmission, the belt can not simply be slipped on to the pulleys. Instead operations requiring the temporary displacement of one pulley toward the other, so as to reduce the distance therebetween, are required. These latter operations of course are followed by the reverse operations to restore the pulleys to their initial distance from each other so as to have within the drive belt the tautness which is essential for proper power transmission. Therefore, in connection with the installation of a new belt, there will be required many mechanical procedures such as loosening and removing nuts, bolts, washers, spacers, portions of a pulley wheel, repositioning parts which are driven by the pulley wheels or which drive the pulley wheels, and of course all of these operations must be reversed to regain the proper tension so as to assure sufficient friction to provide a proper power transmission.

One of the most common situations requiring change of a belt is in the case of vehicles driven by internal combustion engines where failure of a fan belt is most common. This fan belt is used not only to transmit a drive to the fan for cooling the engine but also to the generator, as is well known. Conventionally, when this latter belt breaks, only a skilled mechanic can replace the belt. This operation requires loosening of the pulley carrying components so that at least one of the pulleys can be displaced toward the other, thus permitting the belt to be passed around the pulleys, after which the displaced pulley is returned together with the unit connected thereto to its initial position, or a proper adjustment is made to guarantee proper belt tension.

Thus, it is apparent that considerable inconveniences are required in connection with the changing of a belt, with conventional transmissions.

A primary object of the present invention is to provide a power transmission which will eliminate all of the above inconveniences encountered when changing one belt for another.

In particular, it is an object of the present invention to provide a structure which permits a belt to be placed on a pair of pulleys in condition to transmit power therebetween without, however, requiring any temporary displacement of one of the pulleys toward the other, and, in fact, without requiring the use of any tools whatsoever, so that with the structure of the present invention the replacing of a belt can be carried out very quickly and easily by any unskilled person.

Moreover, it is an object of the present invention to provide a transmission which, even though it permits replacing of a belt without the use of any tools and without the temporary displacement of one pulley toward another, nevertheless provides an exceedingly efficient power transmission.

In addition, it is an object of the invention to provide a transmission capable of accomplishing the above objects while at the same time being quite simple and inexpensive in its construction.

The invention is illustrated by way of example in the accompanying drawings which form part of this application and in which.

Figure 1:
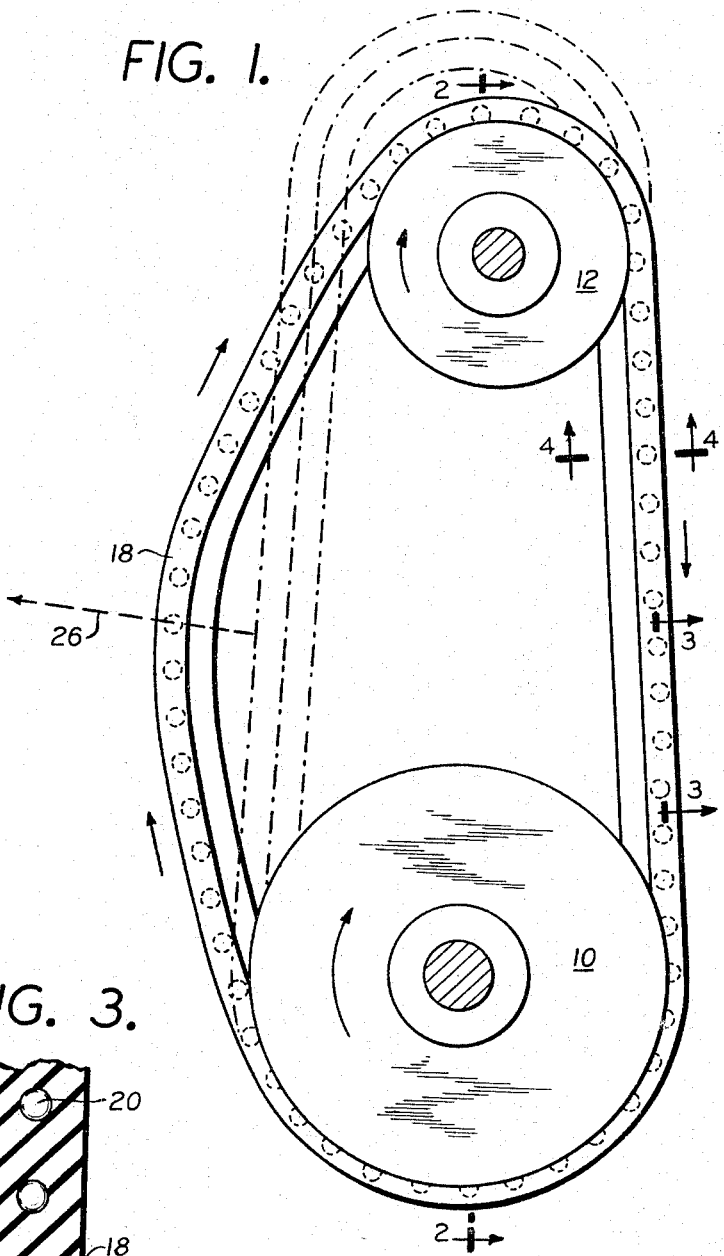
FIG. 1 shows in a side elevation one possible embodiment of a power transmission according to the present invention.
Figure 2:
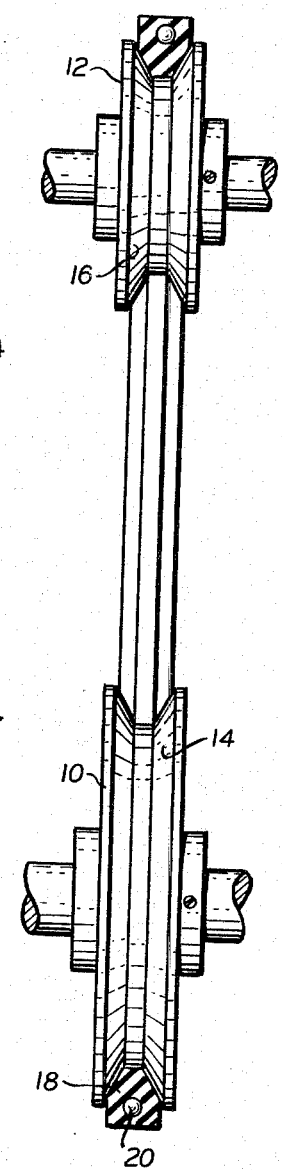
FIG. 2 is a longitudinal sectional illustration of the transmission of FIG. 1, taken along line 2—2 of FIG. 1 in the direction of the arrows.

Referring to FIG. 1, there is illustrated therein a driving pulley 10 and a driven pulley 12. These pulleys are each peripherally grooved, so that the pulley 10 has a peripheral groove 14 and the pulley 12 has a peripheral groove 16. As is apparent from FIG. 2, these pulleys are formed with V-grooves.

The structure of the present invention further includes an endless power-transmission belt 18 which in the illustrated example is a V-belt so as to cooperate properly with the V-grooves 14 and 16.

In accordance with one of the features of the invention the length of the belt 18 is such that it is just great enough to pass about both of the pulleys 10 and 12 without requiring either one of these pulleys to be temporarily displaced toward the other. This is apparent from the dot-dash line illustration of the belt in FIG. 1. From this latter illustration it is apparent that the belt of the present invention is approximately of the minimum length required for it to be placed about both of the pulleys without requiring either one of them to be temporarily displaced toward the other. Of course, after the belt has thus been placed about both pulleys, the operator finger-presses the belt into the V-grooves 14 and 16, and the belt will now remain in these grooves.

Figure 3:
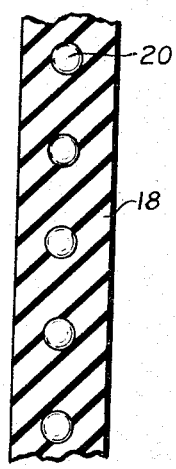
FIG. 3 is a fragmentary longitudinal section of the belt of FIG. 1 taken along line 3—3 of FIG. 1 in the direction of the arrows.

During rotation of the driving pulley 10, which in the example illustrated in FIG. 1 rotates in a clock-wise direction, the belt will be pulled at its right run shown in FIG. 1 while the left run of the belt of FIG. 1 will tend to be pushed by the driving pulley 10. Therefore, because of the length of the belt when it is pressed into the peripheral grooves of the pulleys, this belt, if it were simply of a conventional construction, would be under tension on one side and under compression on the other side, so that in fact there would be a tendency for the belt to assume the dot-dash line condition indicated in FIG. 1 with the result that if any transmission of the rotation of the driving pulley 10 to the driven pulley 12 did take place, the efficiency of this transmission would be extremely low since it would necessarily be accompanied by excessive slippage and very little frictional contact between the belt and the driven pulley 12. It is, of course, for this reason that conventional belts must be fairly taut, so as to have, even when the structure does not operate, a tension sufficient to guarantee an efficient transmission of power, and of course this latter requirement necessitates displacement of the pulleys with respect to each other so as to guarantee the necessary belt-tension. However, in accordance with the present invention, instead of placing the belt under tension even when the transmission does not operate, a means is carried by the belt for amplifying the centrifugal force which acts on the belt during operation of the power transmission of the invention. This means for amplifying the centrifugal force which acts on the belt takes the form, in the illustrated example, of a plurality of weights, which are carried by the belt. In the example shown in FIGS. 1–4, these weights, which are preferably uniformly distributed along the belt, take the form of metal spheres 20. These metal spheres 20 are solid metal balls of the type which are commonly encountered in ball bearings, for example, so that these weights 20 will add considerably to the mass of the belt 18. When the belt 18 is manufactured the weights 20 can be embedded therein so as to be situated within the belt in the manner indicated in FIGS. 3 and 4, and thus while the belt 18 of the present invention will have an exterior appearance like any other belt, actually it will be considerably heavier and thus the weights 20, embedded within and uniformly distributed along the belt 18 throughout the entire length thereof, form a means for amplifying the centrifugal force acting on the belt.

Figures 4, 5:
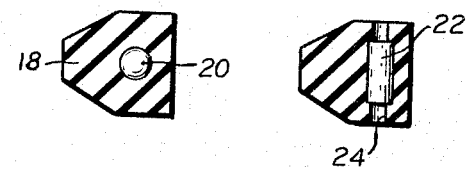
FIG. 4 is a transverse section of the belt of FIG. 1 taken along lines 4—4 of FIG. 1 in the direction of the arrows.
FIG. 5 shows in transverse section a different embodiment of a motion-transmitting belt of the present invention.

Instead of spherical bodies 20, the weights can take the form of cylindrical bodies 22 of the type normally encountered in roller bearings, so that these bodies 22, one of which is shown in FIG. 5 are also in the form of solid metal members adding considerably to the weight of the belt. The bodies 22 are also uniformly distributed along the length of the belt. Moreover, as is shown in FIG. 5, the belt may be provided with vents 24 communicating with the outer atmosphere and with the weights 22, so that in this way any increase in the temperature of the metal bodies during operation of the transmission will be capable of being compensated by dissipation of the heat to the outer atmosphere through the vents 24. Of course, the belt 18 may also be provided with vents where the weights are in the form of the metal spheres 20.

Thus, with the structure of the present invention, the belt 18 provided with the means for amplifying the centrifugal force which acts thereon, is placed about both of the pulleys 10 and 12 when it is necessary to change a belt. For example, an automobile driver may keep at a suitable location the belt of the present invention to replace a conventional fan belt when the latter breaks. Therefore, with the structure of the invention, it will not be necessary for the operator to alter the position of either of the pulleys, and instead the operator will simply place the belt of the invention around both of the pulleys and will finger-press the belt into the peripheral grooves of the pulleys. These are all the operations that are required with the structure of the invention. When the transmission operates the driving pulley 10 will overcome the centrifugal force acting on the right side of the belt, as viewed in FIG. 1, maintaining this side of the belt under tension. The other side of the belt, which tends to be placed under compression, will, because of the centrifugal force amplification provided by the weights of the invention, be thrown outwardly away from the pulleys in the direction of the dotted-line arrow 26 shown in FIG. 1. This amplification of the centrifugal force acting on the belt creates, even at the left side of the belt as viewed in FIG. 1, a tension in the belt, rather than a compression at this left side thereof, and this tension magnifies the friction between the belt and the pulleys so as to guarantee any efficient power transmission which is positive and accompanied by a minimum amount of slippage. It is to be noted that with the structure of the invention as the speed of the driving pulley 10 increases, the effect of the centrifugal force on the belt also increases, providing an increase in tension and therefore an increase in friction and efficiency in the transmission of power.

The minimum length of the belt consistent with a simple placing of the belt about both pulleys without changing the position of either one thereof reduces the oversize of the belt length of a minimum while permitting an immediate and uncomplicated installation of the belt on the pulleys. The uniform distribution of the weights along the length of the belt results in the equidistant spacing of the weights from each other, so that a smooth operation of the transmission is guaranteed.

When the belt of the present invention is installed and the trnasmission is at a standstill, the weights provide sufficient contact and potential friction so that when the drive pulley starts to rotate an immediate transmission of power takes place. Once the transmission is in motion the centrifugal force resulting not only from the weight of the belt itself but also from the weight within the belt acts on the belt to amplify the centrifugal force which would result simply from the weight of the belt itself, with the result that the belt assumes the position indicated in solid lines in FIG. 1. The result is that the slack resulting from the excessive length of the belt, as compared to the length of a conventional belt, is automatically taken up to provide an efficient transmission of power. It is to be noted that the centrifugal force acting on the "pushed" portion of the belt, shown at the left in FIG. 1, exerts on the belt a greater outward thrust, in the direction of the arrow 26 than is exerted simply by the compressive push on the belt, and it is this outward thrust resulting from the centrifugal force derived from the weights of the invention that increases the tension at this left side of the belt, as viewed in FIG. 1, thus showing an efficient power transmission. The tensioned side of the belt shown at the right in FIG. 1 extends along a straight line, thus providing a differential-free transmission of power between the driving and driven pulleys, with a minimum of slack. The degree of tension maintained in the belt will change during acceleration or deceleration, but during periods when the driving pulley 10 rotates at substantially constant speed, the tension in the belt also does not change perceptibly.

It is therefore apparent that while it is possible with the structure of the invention to provide an efficient transmission of power with a belt which can be placed by hand on the pulleys in a minimum amount of time and with a minimum of inconvenience, nevertheless the structure is at the same time quite simple and inexpensive, and no particular skill is required to install the belt of the invention on the pulleys.

It will be understood that while the drive belt illustrated is of the V-type, the invention is equally applicable to other types of belts, such as conventional flat belts. If desired, the drive belt of the patent invention can be used in normal service for driving applications as well as for temporary or emergency applications for which such drive belt is eminently suitable.

It will of course be apparent that the drive belt of the present invention may be used in a limitless variety of drive belt applications other than that specifically illustrated and described, such as in a three pulley application or in vehicles having split pulleys for belt application as well as pulleys relatively displaceable with respect to each other for belt application and adjustment.

Although the present invention has been described in some detail by way of illustration and example for purposes of clarity of understanding, it is understood that certain changes and modifications may be made within the spirit of the invention and scope of the appended claims.

What is claimed is:

1. A power transmission comprising a peripherally grooved driving pulley, a peripherally grooved driven pulley, and an endless drive belt having a length great enough to extend about both pulleys without requiring either one of said pulleys to be displaced toward the other when the belt is placed over said pulleys, said drive belt being situated in the grooves of said pulleys, and means carried by said drive belt for amplifying the effect of centrifugal force which acts thereon during rotation of said driving pulley so as to increase the friction between said belt and pulleys to provide an efficient transmission of power.

2. A transmission as recited in claim 1 and wherein said belt has approximately the minimum length required for it to be able to extend around said pulleys without requiring temporary displacement of one of the pulleys toward the other.

3. A transmission as recited in claim 1 and wherein said means for amplifying the effect of centrifugal force acting on said belt includes a plurality of weights carried by said belt for movement therewith.

4. A transmission as recited in claim 3 and wherein said plurality of weights are uniformly distributed along said belt.

5. A transmission as recited in claim 3 and wherein said weights are embedded within the body of said belt.

6. A transmission as recited in claim 5 and wherein said weights are in the form of solid metal spheres.

7. A transmission as recited in claim 5 and wherein said weights are in the form of solid metal cylinders.

8. A transmission as recited in claim 5 and wherein said belt is formed with vent openings communicating with the weights embedded therein.

9. A transmission as recited in claim 1 and wherein said pulleys respectively have parallel axes.

10. A power transmission comprising driving and driven pulleys each of which is formed with at least one peripheral V-groove, an endless drive belt having a length sufficiently great to extend about said pulleys without requiring temporary displacement of one of the pulleys toward the other when the belt is placed over said pulleys, said drive belt being a V-belt and being situated in part within said V-grooves of said pulleys respectively, and a plurality of weights uniformly distributed along said belt and embedded therein for increasing the effect of centrifugal force which acts on said belt during rotation of said driving pulley to transmit rotation thereof through said belt to said driven pulley.

References Cited

UNITED STATES PATENTS

| | | | |
|---|---|---|---|
| 2,189,049 | 2/1940 | Ungar | 74—233 |
| 2,945,390 | 7/1960 | Bush et al. | 74—237 |
| 3,016,756 | 1/1962 | Jackel | 74—234 |

FOREIGN PATENTS 113,793    4/1945    Sweden.

FRED C. MATTERN, Jr., *Primary Examiner.*

J. A. WONG, *Assistant Examiner.*